(12) United States Patent
Narasimhan et al.

(10) Patent No.: US 12,177,121 B2
(45) Date of Patent: *Dec. 24, 2024

(54) DISTINGUISHING SRv6 MICRO-SID DESTINATION ADDRESS FROM IPv6 DESTINATION ADDRESS

(71) Applicant: Ciena Corporation, Hanover, MD (US)

(72) Inventors: Ashwath Narasimhan, Milpitas, CA (US); Muthurajah Sivabalan, Kanata (CA); Tao Wang, Ottawa (CA); Lakshmi Rajasekaran, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,481

(22) Filed: Oct. 13, 2023

(65) Prior Publication Data

US 2024/0291755 A1 Aug. 29, 2024

Related U.S. Application Data

(63) Continuation of application No. 18/070,673, filed on Nov. 29, 2022, now Pat. No. 11,831,548.

(51) Int. Cl.
*G06F 15/173* (2006.01)
*H04L 45/00* (2022.01)
*H04L 45/741* (2022.01)

(52) U.S. Cl.
CPC ........... *H04L 45/741* (2013.01); *H04L 45/38* (2013.01); *H04L 45/566* (2013.01)

(58) Field of Classification Search
CPC ...... H04L 45/741; H04L 45/38; H04L 45/566

USPC .................................................. 709/228, 238
See application file for complete search history.

(56) References Cited

U.S. PATENT DOCUMENTS

| | | |
|---|---|---|
| 7,120,792 B1 | 10/2006 | Jacobson et al. |
| 7,197,573 B1 | 3/2007 | Jacobson et al. |
| 7,430,176 B2 | 9/2008 | Nalawade et al. |
| 7,539,191 B1 | 5/2009 | Jacobson |
| 7,684,351 B2 | 3/2010 | Vasseur et al. |
| 8,135,834 B1 | 3/2012 | Jacobson et al. |
| 8,274,901 B1 | 9/2012 | Casner et al. |
| 8,422,502 B1 | 4/2013 | Alaettinoglu et al. |
| 8,824,331 B1 | 9/2014 | Alaettinoglu et al. |

(Continued)

FOREIGN PATENT DOCUMENTS

| | | | | |
|---|---|---|---|---|
| CN | 111988266 A | * | 11/2020 | ............. H04L 45/34 |
| CN | 112822104 A | * | 5/2021 | |

(Continued)

*Primary Examiner* — Liang Che A Wang
(74) *Attorney, Agent, or Firm* — Baratta Law PLLC; Lawrence A. Baratta, Jr.

(57) ABSTRACT

A node configured to operate in a network that operates one or more of Internet Protocol version 6 (IPv6) and Segment Routing over IPv6 (SRv6), the node comprising circuitry configured to receive a packet from another node in the network, wherein the node supports both a reduced mode and a non-reduced mode, and determine whether there is an identifier in the packet that indicates whether the packet is based on the reduced mode or the non-reduced mode. The identifier can be utilized to determine whether a destination address in the packet is either an IPv6 destination address or an SRv6 micro-Segment Identifier (uSID).

15 Claims, 7 Drawing Sheets

(56) References Cited

U.S. PATENT DOCUMENTS

| | | |
|---|---|---|
| 8,937,946 B1 | 1/2015 | Kanna et al. |
| 9,979,629 B2 | 5/2018 | Sivabalan et al. |
| 10,033,623 B2 | 7/2018 | Jain et al. |
| 10,158,558 B1 | 12/2018 | Ward et al. |
| 10,165,093 B2 | 12/2018 | Filsfils et al. |
| 10,171,338 B2 | 1/2019 | Filsfils et al. |
| 10,250,494 B2 | 4/2019 | Sivabalan et al. |
| 10,277,558 B2 | 4/2019 | Khan et al. |
| 10,291,516 B2 | 5/2019 | Bryant et al. |
| 10,454,821 B2 | 10/2019 | Filsfils et al. |
| 10,567,295 B2 | 2/2020 | Barton et al. |
| 10,740,408 B2 | 8/2020 | Ramasamy et al. |
| 10,833,976 B2 | 11/2020 | Saad et al. |
| 10,868,755 B2 | 12/2020 | Filsfils et al. |
| 11,057,278 B1 | 7/2021 | Côté et al. |
| 11,102,109 B1 | 8/2021 | Narasimhan et al. |
| 2015/0271034 A1 | 9/2015 | Kanna et al. |
| 2016/0057049 A1 | 2/2016 | Jacobson et al. |
| 2016/0191324 A1 | 6/2016 | Olofsson et al. |
| 2019/0297017 A1 | 9/2019 | Pignataro et al. |
| 2019/0379601 A1 | 12/2019 | Khan et al. |
| 2020/0112495 A1 | 4/2020 | Attarwala et al. |
| 2020/0153856 A1 | 5/2020 | Nainar et al. |
| 2020/0162357 A1* | 5/2020 | Zacks ............... H04L 43/087 |
| 2020/0220811 A1 | 7/2020 | Shah |
| 2021/0092043 A1 | 3/2021 | Filsfils et al. |
| 2021/0160174 A1 | 5/2021 | Kashyap et al. |
| 2021/0243095 A1 | 8/2021 | Attarwala et al. |
| 2021/0392034 A1 | 12/2021 | Boutros et al. |
| 2022/0029918 A1* | 1/2022 | Filsfils ............... H04L 45/741 |
| 2022/0174004 A1* | 6/2022 | Filsfils ............... H04L 45/306 |

FOREIGN PATENT DOCUMENTS

| | | | |
|---|---|---|---|
| CN | 113472650 A * | 10/2021 | ......... H04L 12/4633 |
| CN | 111064664 B * | 4/2022 | ............. H04L 45/50 |
| EP | 3 038 301 B1 | 3/2020 | |
| WO | 2021/0967231 A1 | 4/2021 | |

* cited by examiner

Micro-segment frame format using 128-bit IPv6 address

Packet egressing Device 1

DISTINGUISHING SRv6 MICRO-SID DESTINATION ADDRESS FROM IPv6 DESTINATION ADDRESS

CROSS-REFERENCE TO RELATED APPLICATION

The present disclosure is a continuation of U.S. patent application Ser. No. 18/070,673, filed Nov. 29, 2022, the contents of which are incorporated by reference in their entirety.

FIELD OF THE DISCLOSURE

The present disclosure relates generally to networking and computing. More particularly, the present disclosure relates to systems and methods for distinguishing a Segment Routing over Internet Protocol version 6 (SRv6) micro-SID (uSID) destination address from an Internet Protocol version 6 (IPv6) destination address.

BACKGROUND OF THE DISCLOSURE

Segment Routing over Internet Protocol version 6 (IPv6) (SRv6) is based on source routing paradigm where the topological and service path is encoded in the IPv6 packet header, and a new type of routing header called Segment Routing Header (SRH). See, e.g., RFC 8986, "Segment Routing IPv6 (SRv6) Network Programming," February 2021, and RFC 8754, "IPv6 Segment Routing Header (SRH)," March 2020, the contents of which are incorporated by reference in their entirety. A segment is encoded as an IPv6 address. An ordered list of segments is encoded as an ordered list of IPv6 addresses in the SRH. The active segment is indicated by the Destination Address (DA) of the packet. The next active segment is indicated by a pointer in the new routing header. SRv6 can operate in two modes, namely 1) Reduced Mode, and 2) Non-Reduced Mode. Conventionally, network operators pre-determine the mode they want to support using a global configuration. Once the mode is set, a device (i.e., network element, router, etc.) cannot dynamically operate in the other mode. Both modes do not simultaneously exist on a device.

In the Reduced Mode, the SRH is eliminated, and in the absence of the SRH, at any intermediate point, it is difficult to discern whether the destination address is a normal IPv6 destination address (packet encapsulated by a IPv6 header) or an SRv6 micro-segment destination. Note that SRv6 micro-segment destination (uSID) requires special handling (Shift Operation) in contrast to traditional IPv6 route lookup.

BRIEF SUMMARY OF THE DISCLOSURE

The present disclosure relates to systems and methods for distinguishing a Segment Routing over Internet Protocol version 6 (SRv6) micro-SID (uSID) destination address from an Internet Protocol version 6 (IPv6) destination address. The present disclosure includes some indication in the header to distinguish the SRv6 micro-segment destination address and IPv6 destination address. For example, this can be one or more bits from the 20-bit 'Flow Label' field in the IPv6header to indicate Special handling for a destination address containing 'Compressed SID' (uSID). This implementation is interoperable with devices that do not support this feature. Also, for example, the present disclosure uses the 'TS'-bit in the "flags" field in an Interior Gateway Protocol (IGP)/Border Gateway Protocol Link-State (BGP-LS) Capabilities Sub-Type-Length-Value (TLV) to exchange Terminate and Shift handling support for the uSID in reduced mode amongst network devices. This allows the head-end or Path Computation Element (PCE) to compute optimal Traffic Engineering (TE) paths with minimal number of SIDs based on the capabilities of other devices in the network. It also helps a head-end or PCE to build path based on appropriate SID types (e.g., uSID, uncompressed SID, etc).

In an embodiment, a node is configured to operate in a network that operates one or more of Internet Protocol version 6 (IPv6) and Segment Routing over IPv6 (SRv6). The node includes circuitry configured to determine a packet is to be sent to a second node in the network, with both the node and the second node utilizing Reduced Mode micro-Segment Identifiers (uSIDs), and include an identifier in an IPv6 header of the packet denoting a destination address of the packet includes uSIDs. The circuitry can be further configured to include the identifier responsive to a determination the second node supports the identifier. The circuitry can be further configured to determine a second packet is to be sent to a third node in the network, with one or more of the second packet being IPv6 and the third node not supporting the identifier, and transmit the second packet without the identifier in a corresponding IPv6 header of the second packet. The identifier can be a bit in a Flow Label field in the IPv6 header. The Flow Label field can include 20 bits with a plurality of least significant bits being used for the Flow Label and any of a remaining most significant bits being used for the indicator. The circuitry can be further configured to determine a second packet is to be sent to a third node in the network, with the third node not supporting the identifier, and include the identifier in an IPv6 header of the second packet denoting a destination address of the packet includes uSIDs, such that the third node ignores the identifier. The circuitry can be further configured to send an indicator responsive to the node supporting Terminate and Shift operations on uSIDs. The indicator can be in an SRv6 Capabilities Type-Length-Value (TLV) field.

In a further embodiment, a non-transitory computer-readable medium includes instructions that, when executed, cause a node, in a network that operates one or more of Internet Protocol version 6 (IPv6) and Segment Routing over IPv6 (SRv6), to perform steps of determining a packet is to be sent to a second node in the network, with both the node and the second node utilizing Reduced Mode micro-Segment Identifiers (uSIDs); and including an identifier in an IPv6 header of the packet denoting a destination address of the packet includes uSIDs.

In a further embodiment, a method is implemented by a node configured to operate in a network that operates one or more of Internet Protocol version 6 (IPv6) and Segment Routing over IPv6 (SRv6). The method includes steps of determining a packet is to be sent to a second node in the network, with both the node and the second node utilizing Reduced Mode micro-Segment Identifiers (uSIDs); and including an identifier in an IPv6 header of the packet denoting a destination address of the packet includes uSIDs.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
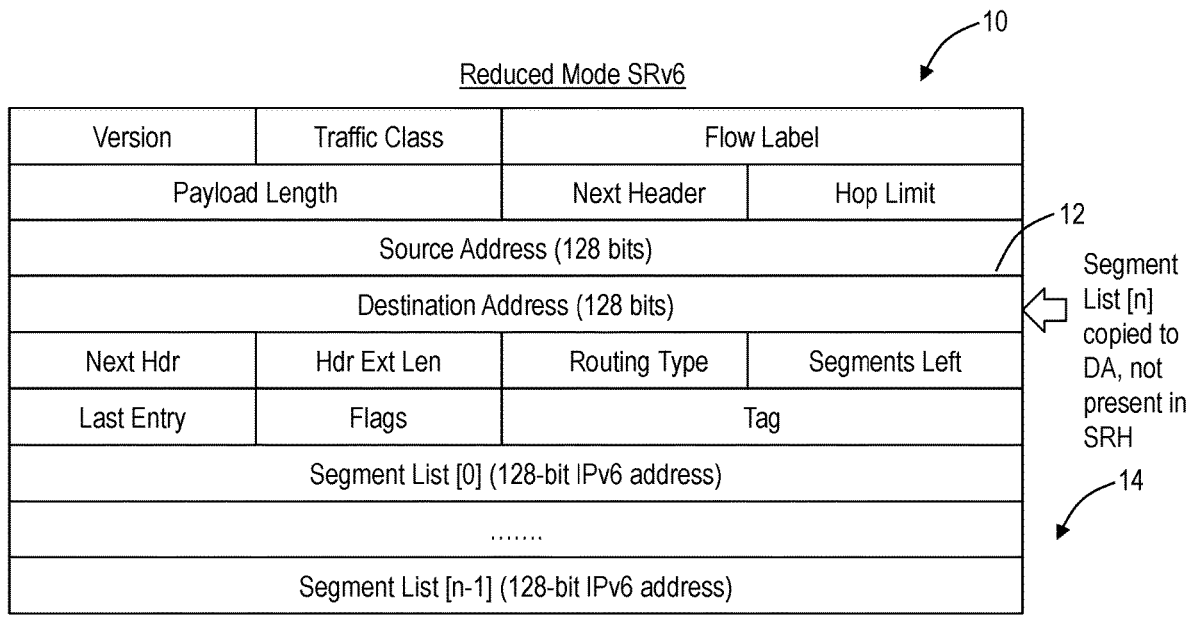
FIG. 1 is a diagram of a Reduced Mode SRv6 header (SRH).

Again, the present disclosure relates to systems and methods for distinguishing a Segment Routing over Internet Protocol version 6 (SRv6) micro-SID (uSID) destination address from an Internet Protocol version 6 (IPv6) destination address. The present disclosure includes some indication in the header to distinguish the SRv6 micro-segment destination address and IPv6 destination address. For example, this can be one or more bits from the 20-bit 'Flow Label' field in the IPv6header to indicate Special handling for a destination address containing 'Compressed SID' (uSID). This implementation is interoperable with devices that do not support this feature. Also, for example, the present disclosure uses the 'TS'-bit in the "flags" field in an Interior Gateway Protocol (IGP)/Border Gateway Protocol Link-State (BGP-LS) Capabilities Sub-Type-Length-Value (TLV) to exchange Terminate and Shift handling support for the uSID in reduced mode amongst network devices. This allows the head-end or Path Computation Element (PCE) to compute optimal Traffic Engineering (TE) paths with minimal number of SIDs based on the capabilities of other devices in the network. It also helps a head-end or PCE to build path based on appropriate SID types (e.g., uSID, uncompressed SID, etc).

Segment Routing Overview

Segment Routing (SR) is a technology that implements a source routing paradigm. A packet header includes a stack of function identifiers, known as segments, which define an ordered list of functions to be applied to the packet. A segment can represent any instruction, topological, or service-based. A segment can have a local semantic to an SR node or global within an SR domain. These functions include, but are not limited to, the forwarding behaviors to apply successively to the packet, notably destination-based unicast forwarding via a sequence of explicitly enumerated nodes (domain-unique node segments) and links (adjacency segments), and the like. SR allows forcing a flow through any topological path and service chain while maintaining a per-flow state only at the ingress node to the SR domain. Segment Routing is described, e.g., in Fiflsfils et al., RFC 8402, "Segment Routing Architecture," Internet Engineering Task Force (IETF), July 2018, the contents of which are incorporated herein by reference. A particular attraction of Segment Routing is that it obviates the need to install and maintain any end-to-end (e2e) path state in the core network. Only the ingress node for a particular flow needs to hold the segment stack, which is applied as the header of every packet of that flow, to define its route through the network. This makes Segment Routing particularly suited to control by a Software-Defined Networking (SDN) model.

Segment Routing can be directly applied to Multiprotocol Label Switching (MPLS) with no change in the forwarding plane. A segment is encoded as an MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published in July 2015 as draft-previdi-6man-segment-routing-header (available online at tools.ietforg/htmVdraft-previdi-6man-segment-routing-header-08) and RFC 8754, "IPv6 Segment Routing Header (SRH)," March 2020, the contents of both are incorporated by reference herein. A segment is encoded as an IPv6 address. An ordered list of segments is encoded as an ordered list of IPv6 addresses in the routing extension header. The Segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR, including, for example, scalable end-to-end policy, easy incorporation in IP and SDN architectures, operational simplicity, a balance between distributed intelligence, centralized optimization, and application-based policy creation, and the like.

In loose source routing such as Segment Routing, a source node chooses a path and encodes the chosen path in a packet header as an ordered list of segments. The rest of the network executes the encoded instructions without any further per-flow state. Segment Routing provides full control over the path without the dependency on network state or signaling to set up a path. This makes Segment Routing scalable and straightforward to deploy. Segment Routing (SR) natively supports both IPv6 (SRv6) and MPLS (SR-MPLS) forwarding planes and can co-exist with other transport technologies, e.g., Resource Reservation Protocol (RSVP)-Traffic Engineering (RSVP-TE) and Label Distribution Protocol (LDP).

In Segment Routing, a path includes segments which are instructions a node executes on an incoming packet. For example, segments can include forward the packet according to the shortest path to the destination, forward through a specific interface, or deliver the packet to a given application/service instance). Each Segment is represented by a Segment Identifier (SID). All SIDs are allocated from a Segment Routing Global Block (SRGB) with domain-wide scope and significance, or from a Segment Routing Local Block (SRLB) with local scope. The SRGB includes the set of global segments in the SR domain. If a node participates in multiple SR domains, there is one SRGB for each SR domain. In SRv6, the SRGB is the set of global SRv6 SIDs in the SR domain.

A segment routed path is encoded into the packet by building a SID stack that is added to the packet. These SIDs are popped by processing nodes, and the next SID is used to decide forwarding decisions. A SID can be one of the following types—an adjacency SID, a prefix SID, a node SID, a binding SID, and an anycast SID. Each SID represents an associated segment, e.g., an adjacency segment, a prefix segment, a node segment, a binding segment, and an anycast segment.

An adjacency segment is a single-hop, i.e., a specific link. A prefix segment is a multi-hop tunnel that can use equal-cost multi-hop aware shortest path links to reach a prefix. A prefix SID can be associated with an IP prefix. The prefix SID can be manually configured from the SRGB and can be distributed by intermediate system-intermediate system (ISIS) or open shortest path first (OSPF). The prefix segment steers the traffic along the shortest path to its destination. A node SID is a special type of prefix SID that identifies a specific node. It is configured under the loopback interface with the loopback address of the node as the prefix. A prefix segment is a global segment, so a prefix SID is globally unique within the segment routing domain. An adjacency segment is identified by a label called an adjacency SID, which represents a specific adjacency, such as egress interface, to a neighboring router. The adjacency SID is distributed by ISIS or OSPF. The adjacency segment steers the traffic to a specific adjacency.

A binding segment represents an SR policy. A head-end node of the SR policy binds a Binding SID (BSID) to its policy. When the head-end node receives a packet with an active segment matching the BSID of a local SR Policy, the head-end node steers the packet into the associated SR Policy. The BSID provides greater scalability, network opacity, and service independence. Instantiation of the SR Policy may involve a list of SIDs. Any packets received with an active segment equal to BSID are steered onto the bound SR Policy. The use of a BSID allows the instantiation of the policy (the SID list) to be stored only on the node or nodes that need to impose the policy. The direction of traffic to a node supporting the policy then only requires the imposition of the BSID. If the policy changes, this also means that only the nodes imposing the policy need to be updated. Users of the policy are not impacted. The BSID can be allocated from the local or global domain. It is of special significance at the head-end node where the policy is programmed in forwarding.

SR Traffic Engineering (SR-TE) provides a mechanism that allows a flow to be restricted to a specific topological path, while maintaining per-flow state only at the ingress node(s) to the SR-TE path. It uses the Constrained Shortest Path First (CSPF) algorithm to compute paths subject to one or more constraint(s) (e.g., link affinity) and an optimization criterion (e.g., link latency). An SR-TE path can be computed by a head-end of the path whenever possible (e.g., when paths are confined to single IGP area/level) or at a Path Computation Engine (PCE) (e.g., when paths span across multiple IGP areas/levels).

uID

The SIDs described herein so far can be referred to as classical or uncompressed SIDs. There is a micro-SID (uSID) implementation that enables compression of the SRv6 header (SRH). Example description of the uSID is provided in Filsfils et al., draft-filsfils-spring-net-pgm-extension-srv6-usid-13, "Network Programming extension: SRv6 uSID instruction," 13 Jun. 2022, and A. Tulumello et al., "Micro SIDs: a solution for Efficient Representation of Segment IDs in SRv6 Networks," 2020 16th International Conference on Network and Service Management (CNSM), 2020, pp. 1-10, doi: 10.23919/CNSM50824.2020.9269075, the contents of each are incorporated by reference in their entirety.

SRv6 Modes

Again, SRv6 can operate in two modes, namely 1) Reduced Mode, and 2) Non-Reduced Mode. The conventional approach includes manual configuration by an operator, homogenous configuration in a network, i.e., all network elements utilize the same mode, the standards do not support sharing mode capabilities, there is no dynamic configuration of modes, and a single network element cannot operate in different modes simultaneously on different links.

Figure 2:
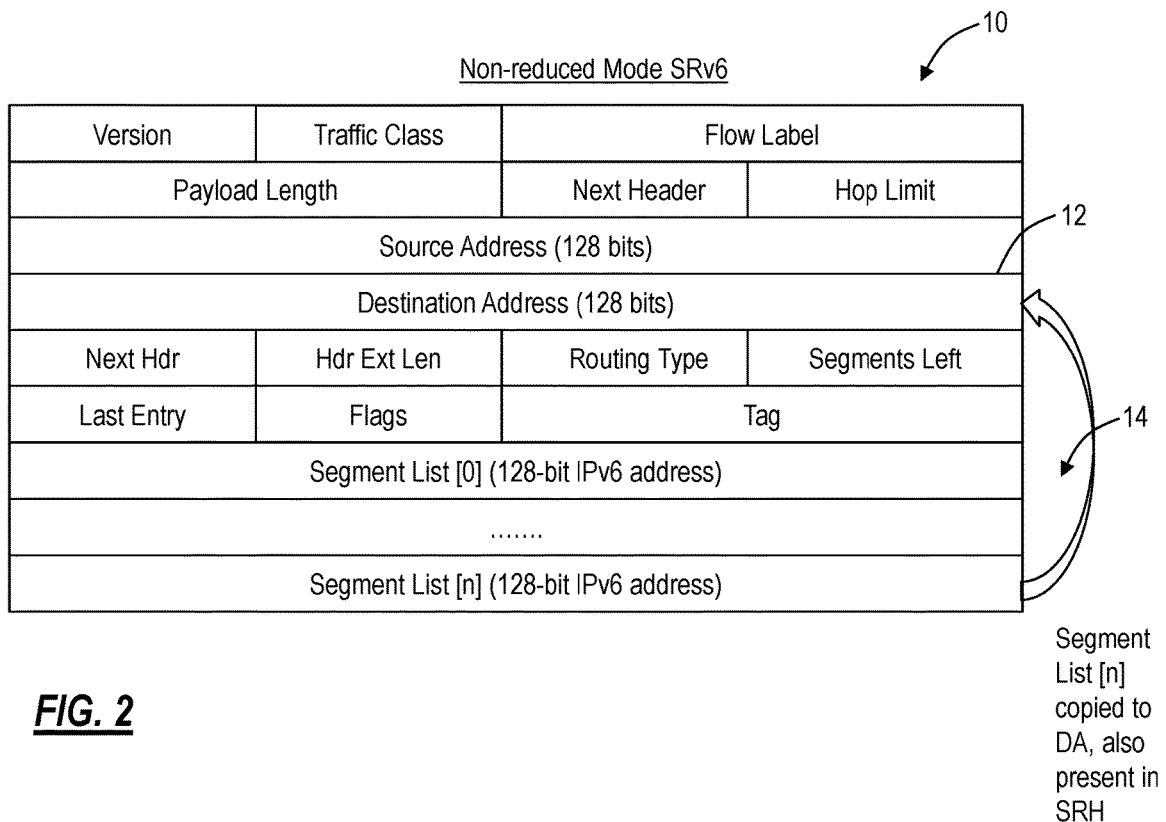
FIG. 2 is a diagram of a Non-Reduced Mode SRv6 header (SRH).

FIG. 1 is a diagram of a Reduced Mode SRv6 header (SRH) 10. FIG. 2 is a diagram of a Non-Reduced Mode SRv6 header (SRH) 10. The SRH 10 is a data structure that is appended to a packet, and it includes various fields as are known in the art. For brevity, these various fields are not described in detail and are described in RFC 8754, "IPv6 Segment Routing Header (SRH)," March 2020. For the different modes, there is a Destination Address (DA) field 12 which can be used to reduce the size of the overall SRH 10 in the Reduced Mode. The SRH 10 also includes a segment list 14 which includes the Segment Identifiers (SIDs). In the 'Reduced Mode', the size of the SRH 10 is decremented by one Segment Identifier (SID). This is achieved by excluding the last SID from the SRH 10 of the IPv6 Packet header because it is placed in the Destination Address field 2 of the IPv6 packet header, and the packet is forwarded to the destination address directly. In this mode the source does not require the entire SID list to be preserved in the SRH 10. Devices that operate in the 'Reduced mode' use a smaller packet size because of the absence of the SRH. The 'Reduced Mode' is especially useful in conjunction with a micro-SID (uSID). In the 'Non-Reduced Mode', the entire SID list is stored in the SRH 10.

Figure 3:
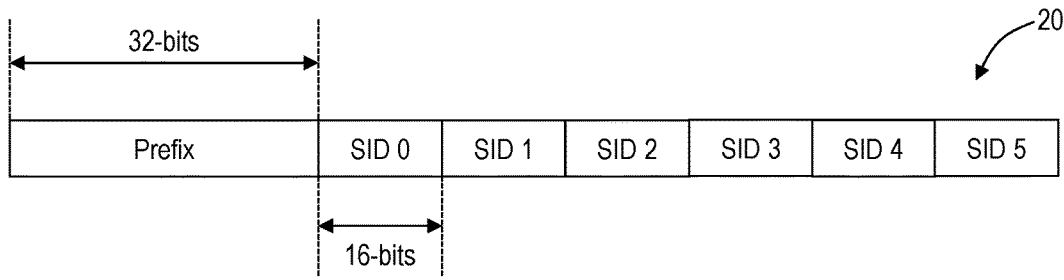
FIG. 3 is a diagram of a micro-Segment frame format using a 128-bit IPv6 Address.

An uncompressed SRv6 SID is 128-bit long. The SRv6 architecture supports the ability to carry multiple smaller SIDs called micro-SIDs (uSIDs) in a 128 uncompressed SID. Such ability leads to reduced MTU overhead when associated with uncompressed SIDs. A uSID can be 16-bit long. The 128-bit IPv6 address shares a common prefix and a number of uSIDs as shown in FIG. 3 which is a diagram of a micro-Segment Frame Format 20 using a 128-bit IPv6 Address. In the example of FIG. 3, the common prefix is 32 bits long.

Figure 4:
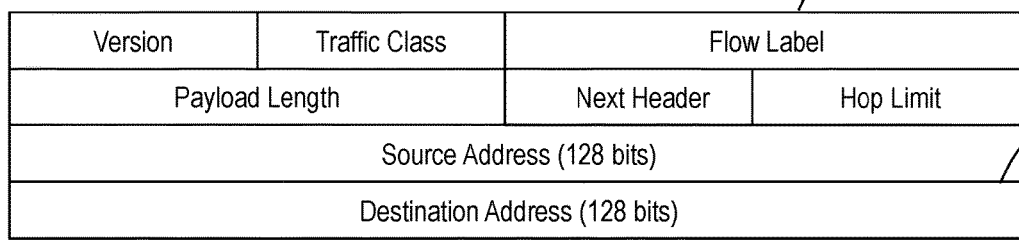
FIG. 4 is a diagram of a Reduced Mode SRv6 micro-Segment frame format.
Figure 5:
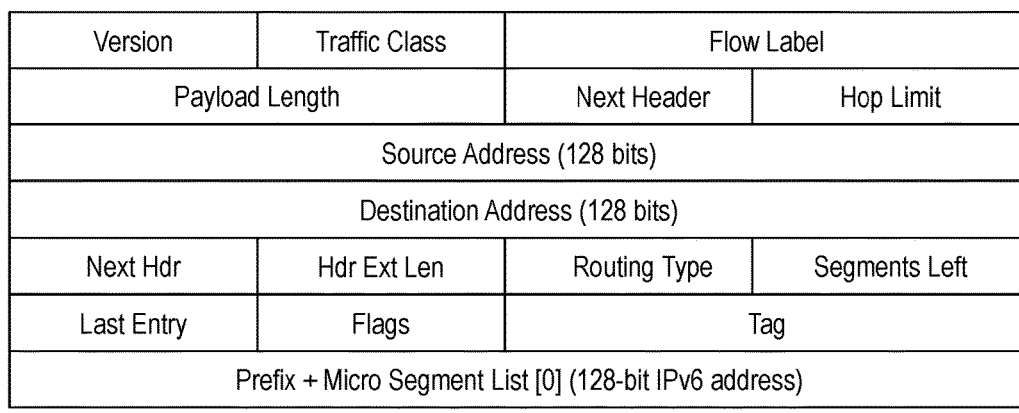
FIG. 5 is a diagram of a Reduced Mode SRv6 micro-Segment frame format.

In the case of SRv6 network programming model that uses the uSID based mechanism, a frame format 30 of 'Reduced mode' is shown in FIG. 4. As shown in FIG. 4, the common 32-bit prefix and the SID list containing 16-bit segments are copied to the Ipv6 Header's Destination Address 12. In the case where the SID list contains more than six 16-bit segments, one or more SRH(s) shall be appended to the IPv6 header, and the remaining segments are encoded using the same strategy in the SRH. FIG. 5 is a diagram of a Reduced Mode SRv6 micro-Segment frame format 40.

Reduced Mode uSID

Referring back to FIG. 4, Reduced Mode is a popular choice for uSID based mechanism. When a device operates in Reduced Mode using uSID mechanism, the SRH is eliminated as shown in FIG. 4. In the absence of SRH, at any intermediary point, it is hard to discern whether the destination address is a normal IPv6 destination address (packet encapsulated by a IPv6 header) or an SRv6 micro-segment destination. This problem is seen only in the absence of SRH. When SRH is present, the Next Header field in the IPv6 header would indicate the presence of an SRv6 frame and therefore the device can handle the frame correctly by sending it to the correct pipeline. Note that SRv6 micro-segment destination (uSID) requires special handling (Shift Operation) in contrast to traditional IPv6 route lookup.

Proposed Solution

The frame format 30 of the 'Reduced mode' for the IPv6 header includes a 20-bit "Flow Label" field 50. The "Flow Label" field 50 is used by a router to label the packets belonging to the same flow at the source. This is done mostly to request special handling by intermediate IPv6 routers, such as non-default quality of service or real-time service. An intermediate router can compute a hash of the source address, the destination address, and the assigned flow label of the packets. Ingress routers that do not support the functionality of "Flow Label" field 50, set the "Flow Label" field 50 to 0. Transit routers that do not support the functionality of "Flow Label" field 50, keep the "Flow Label" field 50 unchanged.

Figure 6:
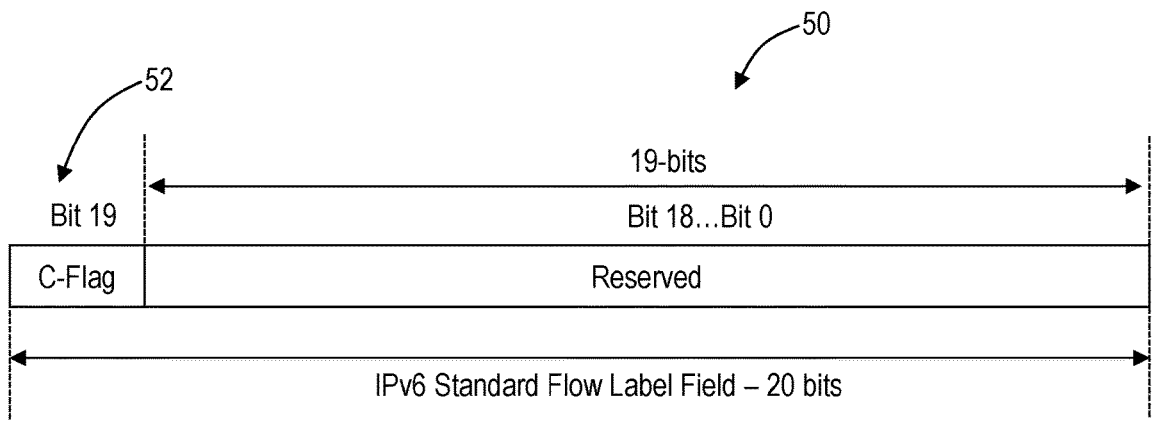
FIG. 6 is a diagram of a "Flow Label" field.

FIG. 6 is a diagram of a Flow Label field 50. Conventionally, the Flow Label field 50 includes a flow label having 20 bits. The present disclosure proposes the "Flow label" field 50 to be modified and extended to include a 'Compressed SID' bit (C-flag) 52 that would indicate the type of SRv6 SID the packet supports. Of note, the term C-flag 52 can be different in different implementations, but functionally this flag is used to determine whether the Destination Address 12 is SRv6 or IPv6. That is, the C-flag 52 field is used to distinguish the Destination Address 12 between SRv6 or IPv6. For example, the C-flag 52 can be set to one value (e.g., 1 or 0) to indicate the Destination Address 12 is SRv6 and the other value to indicate the Destination Address 12 is IPv6.

In an embodiment, Bit 19 in the Flow Label field 50 represents the 'Compressed SID' bit. For example, if Bit-19 is set to '1', then this indicates that the incoming packet's Destination address has a compressed SID, i.e., uSID and therefore it needs special handling (Terminate and SHIFT operation) at the intermediate routers. If Bit 19 is set to '0', then this indicates that the incoming packet's Destination address is a normal IPv6 address and does not need any special handling at the intermediate routers. Bit 18 to Bit 0 can have the same functionality as described in RFC 6437, IPv6 Flow Label Specification, November 2011, the contents of which are incorporated by reference, where the flow label is used as part of load distribution scheme.

Of note, the precedence of borrowing a field from a standard IPv6 header or modifying a field in the standard IPv6 header is prevalent and reasonable. There are IETF drafts available that tackle different problems by modifying IPv6 Header. Also, note that most of the hardware only use 16-to-18-bit least significant bits (LSB) of the 'Flow Label' field 50 for hash computation. Thus, the entire 20 bits in the 'Flow Label' field are not fully utilized for Hash computations.

Also, of note, while the present disclosure proposes in one embodiment to include the C-flag field 52 in the 'Flow Label' field 50, those skilled in the art will recognize there are other areas in the IPv6 header where a similarly functional flag can be located to distinguish the Destination Address 12.

Figure 7:
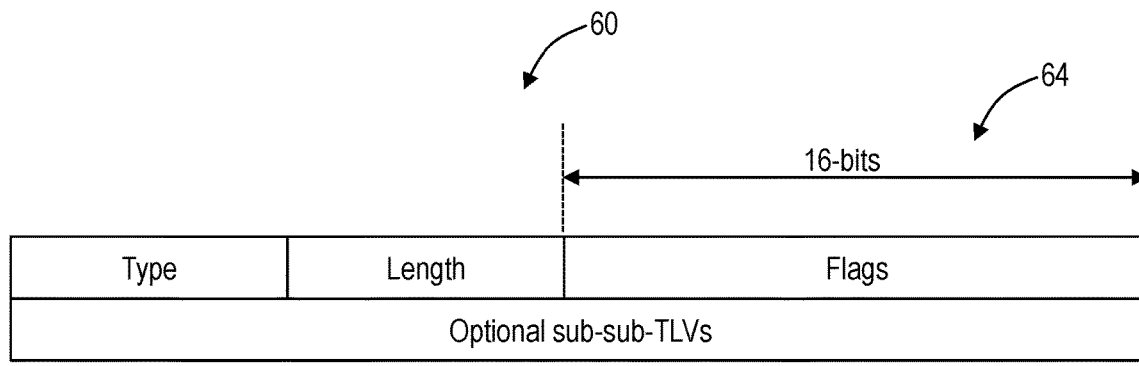
FIG. 7 is a diagram of a SRv6 Capabilities sub-TLV.
Figure 8:
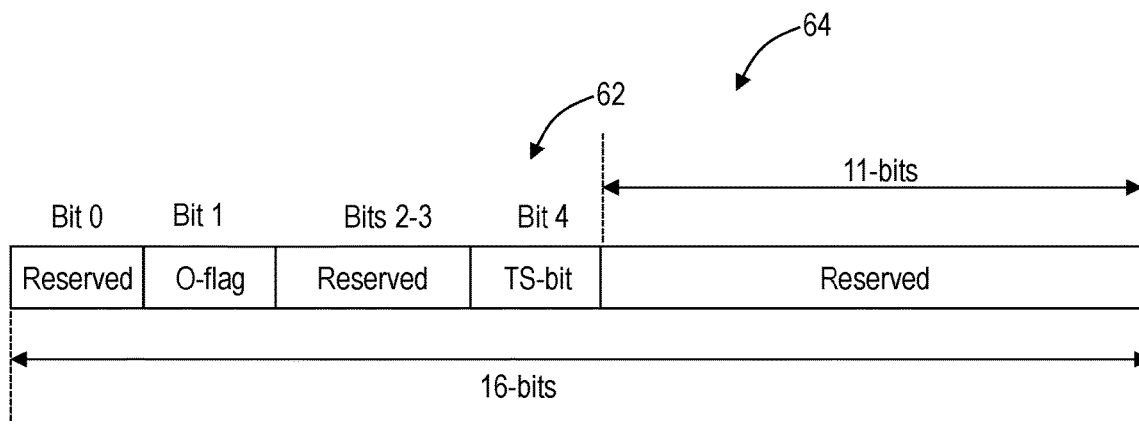
FIG. 8 is a diagram of the Flags field in the SRv6 Capabilities Sub-TLV of FIG. 7.

FIG. 7 is a diagram of a SRv6 Capabilities Sub-TLV 60. Also, the present disclosure includes an exchange of the Special Handling capability support (Terminate and Shift) via a flag 62 in Flags field 64 in the Router Capability Sub-TLV 60. The SRv6 Capabilities Sub-TLV 60 for routing protocols (OSPF, ISIS and BGP-LS) has the format as shown in FIG. 7. The present disclosure proposes the Flags field 64 to be extended to include a 'TS' (Terminate and Shift) bit 62 that would indicate the special handling support in a device. This is shown in FIG. 8 which is a diagram of the Flags field 64 in the SRv6 Capabilities Sub-TLV 60. In an embodiment, Bit 4 represents the 'TS' bit 62. If Bit 4 is set to '1', e.g., then this indicates that the device has the capability to perform the Terminate and Shift operation for a uSID in reduced mode. If Bit 4 is set to '0', then this indicates that the device cannot support the Terminate and Shift operation for uSIDs in Reduced mode. By default, Bit-4 can be set to '0'.

Using the information in the "TS" bit 62 in the SRv6 Capabilities Sub-TLV 60 helps network elements such as a head-end or PCE compute optimal Traffic Engineering (TE) paths with the minimal number of SIDs. It also helps a head-end or PCE to build path based on appropriate SID types (e.g., uSID, uncompressed SID, etc).

Reduced Mode uSID Operation with Proposed Approach

Figure 9:
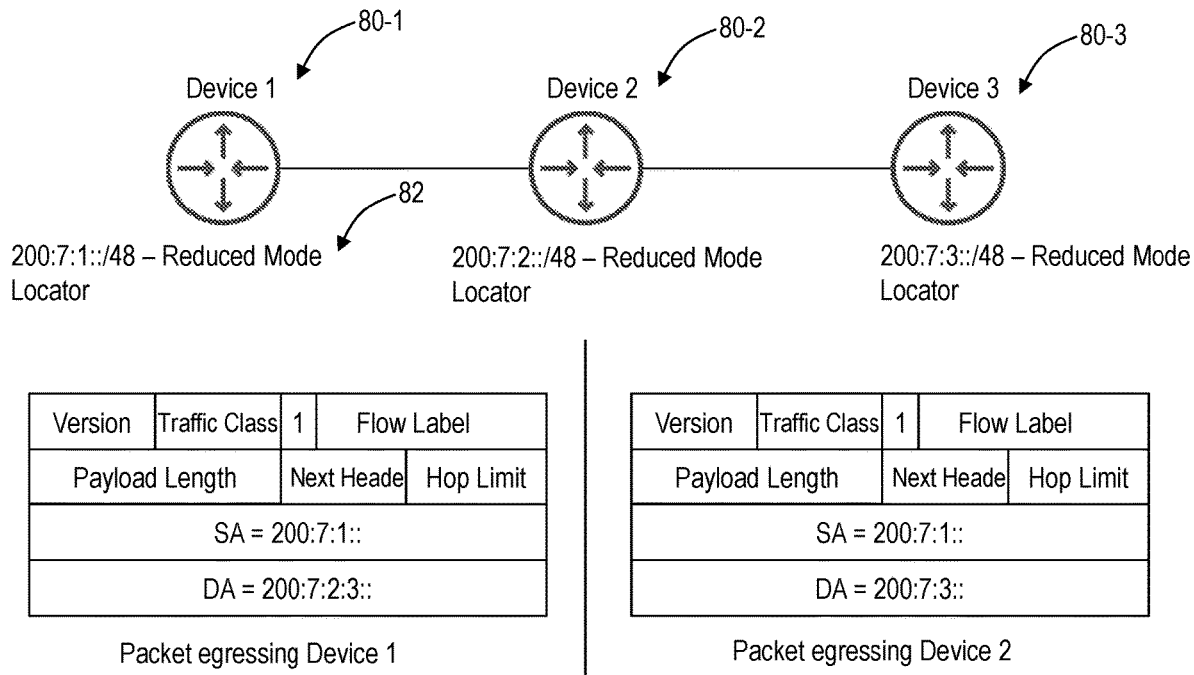
FIG. 9 is a network diagram of an SRv6 topology example with uSID traffic in the Reduced Mode.

FIG. 9 is a network diagram of an SRv6 topology example with uSID traffic in the Reduced Mode. FIG. 9 includes three device 80-1, 80-2, 80-3, i.e., routers, nodes, network elements, etc., connected to one another. The devices 80-1, 80-2, 80-3 operate in the Reduced Mode and are uSID capable. The devices 80-1, 80-2, 80-3 have locators 82 assigned for the Reduced Mode.

Let us assume that the device 80-1 picks a policy that contains the device 80-2 as one of the hops when the device 80-1 wants to send traffic to the device 80-3. In order to support uSID operation in the Reduced Mode, the packet egressing the device 80-1 will have destination IPv6 address as 200:7:2:3:: and source IPv6 address as 200:7:1::. The packet will not have any SRH in the above example. In addition, the packet will also have the C-flag 52 (Compressed SID Flag) SET to '1' to indicate that the destination address has 'Compressed SID' and requires special handling. When the packet reaches the device 80-2, the device 80-2 checks and records that the C-Flag 52 is SET to '1'. The device 80-2 therefore treats the destination IPv6 address as a special case of compressed SID (uSID) and performs the pop, SHIFT and lookup operation (NEXT-C-SID operation) as described in draft-filsfilscheng-spring-srv6-srh-compression-02, "Compressed SRv6 Segment List Encoding in SR," Jul. 28, 2021, available at datatracker.ietf.org/doc/htmVdraft-filsfilscheng-spring-srv6-srh-compression-02, the contents of which are incorporated by reference in their entirety. The packet egressing device 80-2 will have destination IPv6 address as 200:7:3:: and will continue to have the C-flag 52 SET to '1'.

Interoperability and Backward Compatibility—Compatible→Non-Compatible

Figure 10:
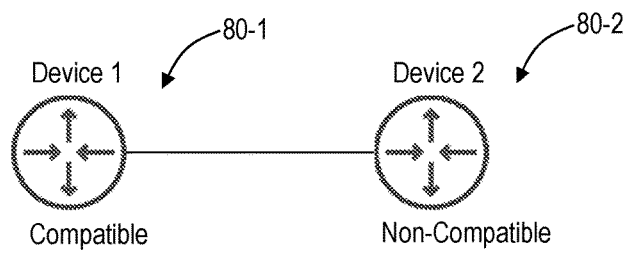
FIG. 10 is a network diagram with two devices illustrating one compatible and one non-compatible device.

FIG. 10 is a network diagram with two devices 80-1, 80-2 illustrating one compatible and one non-compatible device. The device 80-1 implements the C-flag 52 and hence is termed 'Compatible' while the device 80-2 does not implement the C-flag 52 and therefore termed 'non-compatible'. When the C-flag 52 is SET to '1' and transmitted by the device 80-1 to the device 80-2, the device 80-2 would compute the entropy-based hash based on the 20-bit flow label. The device 80-2 would probably pick a different path to send the packet further for the traffic flow.

Non-Compatible→Compatible MSB Bit RESET

Figure 11:
FIG. 11 is a network diagram of the devices illustrating resetting the C-flag.

FIG. 11 is a network diagram of the devices 80-1, 80-2 illustrating resetting the C-flag 52. The device 80-1 is not compatible with the present disclosure while the device 80-2 is. Assuming the device 80-1 uses all the 20 bits of the Flow Label field 50. When the 20$^{th}$ bit of the 'Flow label' field is SET to '0' and transmitted by the device 80-1 to the device 80-2, the device 80-2 would compute the entropy-based hash based on the 19-bit flow label. The Flow-label MSB bit which is set to '0' would be ignored.

Non-Compatible→Compatible MSB Bit SET

Figure 12:
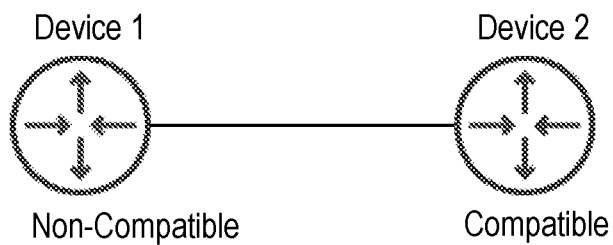
FIG. 12 is a network diagram of the devices illustrating setting the C-flag.

FIG. 12 is a network diagram of the devices 80-1, 80-2 illustrating setting the C-flag 52. Assuming that the device 80-1 uses all the 20 bits of the Flow Label field. When 20$^{th}$ bit of the 'Flow label' field is SET to '1' and transmitted by the device 80-1 to the device 80-2, the device 80-2 would compute the entropy-based hash based on the 19-bit Flow label. The Flow-label of MSB bit would indicate the presence of uSID and a special handling would be required. However, the termination (POP) would fail since the destination IPv6 address would not match any decapsulation entry in the hardware tables. Therefore the device 80-2 will perform a look-up based on the routing table and forward the packet to its destination. For data packets originating from the device 80-1, the device 80-2 knows about the device 80-1 capabilities the device 80-2 can also choose to ignore the 20$^{th}$ Bit for Terminate & Shift operation.

Note, typically, hardware computes 'Flow Labels' that are 18 bits long and these bits are used in hash computation along with source and destination address to identify unique flows. The full 20 bits allocated to the flow label is never used. Hence the above scenario is rarely encountered.

Example Node

Figure 13:
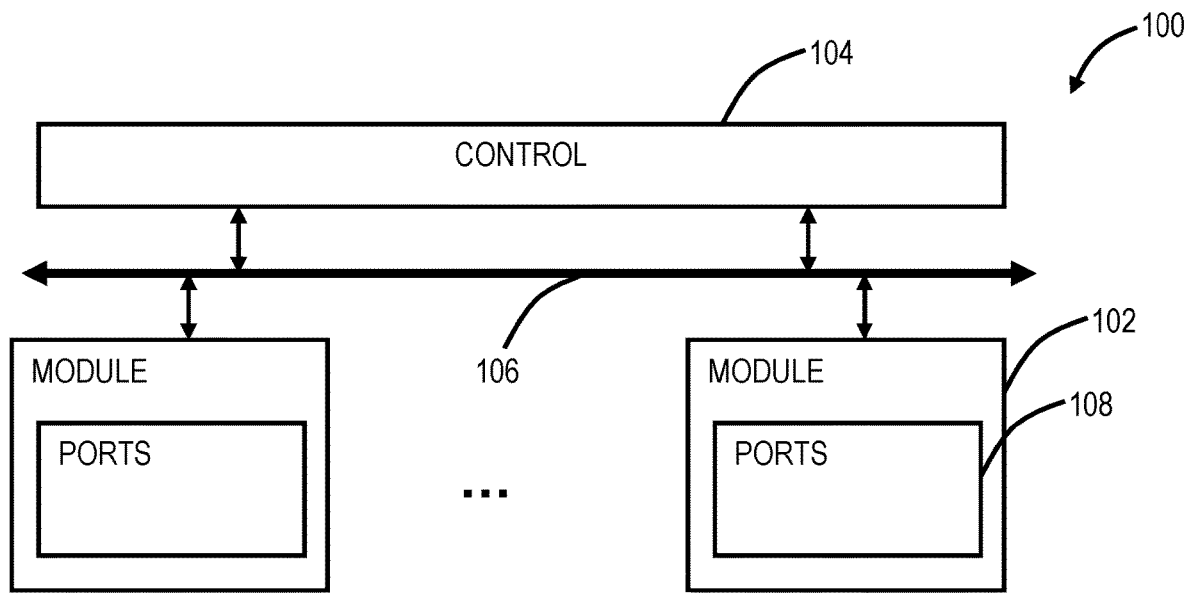
FIG. 13 is a block diagram of an example implementation of a node.

FIG. 13 is a block diagram of an example implementation of a node 100, such as for the devices 80. Those of ordinary skill in the art will recognize FIG. 13 is a functional diagram in an oversimplified manner, and a practical embodiment may include additional components and suitably configured processing logic to support known or conventional operating features that are not described in detail herein.

In an embodiment, the node 100 is a packet switch, but those of ordinary skill in the art will recognize the systems and methods described herein can operate with other types of network elements and other implementations that support SR networking. In this embodiment, the node 100 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the node 100. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the node 100. The network interface may be utilized to communicate with an element manager, a network management system, the PCE, the SDN controller, etc. Additionally, the control module 104 can include a database that tracks and maintains provisioning, configuration, operational data, and the like.

Again, those of ordinary skill in the art will recognize the node 100 can include other components which are omitted for illustration purposes, and that the systems and methods described herein are contemplated for use with a plurality of different network elements with the node 100 presented as an example type of network element. For example, in another embodiment, the node 100 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 13 is meant to provide a functional view, and those of ordinary skill in the art will recognize actual hardware implementations may vary.

Example Controller

Figure 14:
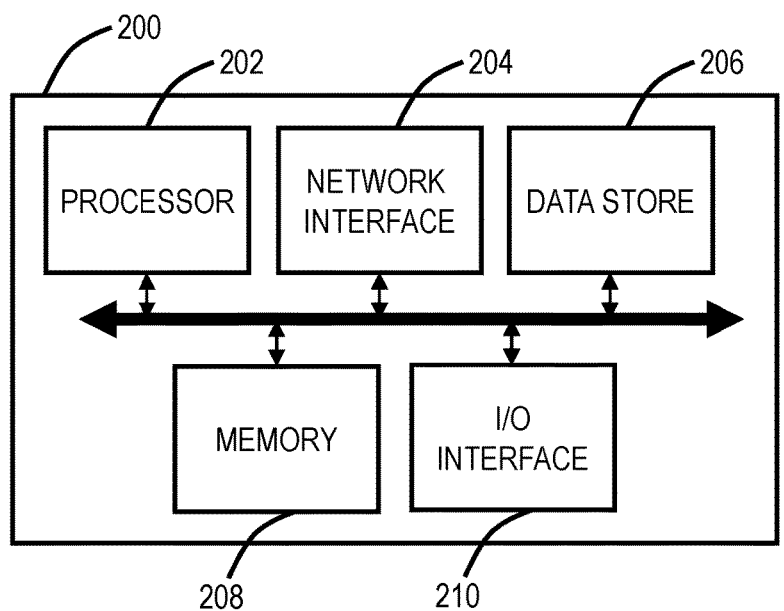
FIG. 14 is a block diagram of an example processing device.

FIG. 14 is a block diagram of an example processing device 200, which can form a control module for the node 100, a PCE, etc. The processing device 200 can be part of the node 100, or a stand-alone device communicatively coupled to the node 100. Also, the processing device 200 can be referred to in implementations as a control module, a shelf controller, a shelf processor, a system controller, etc. The processing device 200 can include a processor 202 which is a hardware device for executing software instructions. The processor 202 can be any custom made or commercially available processor, a central processing unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory, to communicate data to and from the memory, and to generally control operations of the processing device 200 pursuant to the software instructions. The processing device 200 can also include a network interface 204, a data store 206, memory 208, an I/O interface 210, and the like, all of which are communicatively coupled to one another and to the processor 202.

The network interface 204 can be used to enable the processing device 200 to communicate on a data communication network, such as to communicate to a management system, to the nodes, a PCE, an SDN controller, and the like. The network interface 204 can include, for example, an Ethernet module. The network interface 204 can include address, control, and/or data connections to enable appropriate communications on the network. The data store 206 can be used to store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the processing device 200 to communicate with other devices.

Process

Figure 15:
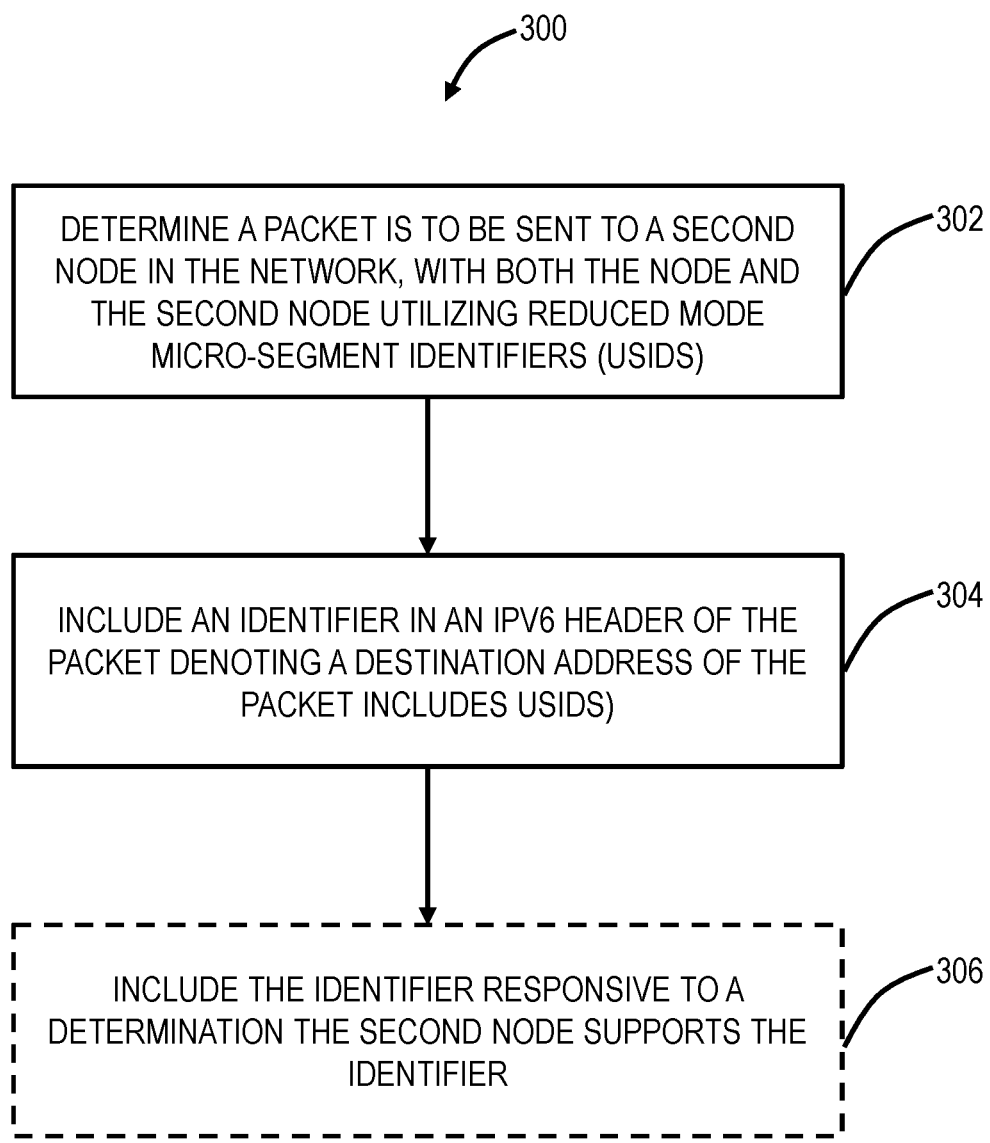
FIG. 15 is a flowchart of a process for distinguishing a Segment Routing over Internet Protocol version 6 (SRv6) micro-SID (uSID) destination address from an Internet Protocol version 6 (IPv6) destination address.

FIG. 15 is a flowchart of a process 300 for distinguishing a Segment Routing over Internet Protocol version 6 (SRv6) micro-SID (uSID) destination address from an Internet Protocol version 6 (IPv6) destination address. The process 300 contemplates implementation as a method having steps, via a node in a network, via a non-transitory computer-readable medium having instructions that, when executed, cause a node to perform the steps.

The process 330 includes determining a packet is to be sent to a second node in the network, with both the node and the second node utilizing Reduced Mode micro-Segment Identifiers (uSIDs) (step 302), and including an identifier in an IPv6 header of the packet denoting a destination address of the packet includes uSIDs (step 304). The process 300 can include including the identifier responsive to a determination the second node supports the identifier (step 306).

The process 300 can include determining a second packet to a third node in the network, with one or more the second packet being IPv6 and the third node not supporting the identifier, and transmitting the second packet without the identifier in the IPv6 header. The identifier can be a bit in a Flow Label field in the IPv6 header. The Flow Label field can include 20 bits with 18 least significant bits being used for the Flow Label and either of a 2 most significant bits being used for the indicator. The process 300 can include determining a second packet to a third node in the network, with the third node not supporting the identifier, and including the identifier in an IPv6 header of the packet denoting a destination address of the packet includes uSIDs, such that the third node ignores the identifier.

The process 300 can include sending an indicator responsive to the node supporting Terminate and Shift operations on uSIDs. The indicator can be in an SRv6 Capabilities Type-Length-Value (TLV) field.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A node configured to operate in a network that operates one or more of Internet Protocol version 6 (IPv6) and Segment Routing over IPv6 (SRv6), the node comprising circuitry configured to:
   receive a packet from another node in the network, wherein the node supports both a reduced mode and a non-reduced mode,
   determine whether there is an identifier in the packet that indicates whether the packet is based on the reduced mode or the non-reduced mode, wherein the identifier is utilized to determine whether a destination address in the packet is either an IPV6 destination address or an SRv6 micro-Segment Identifier (uSID), wherein the identifier is a bit in a Flow Label field in an IPV6 header of the packet, and
   perform handling of the packet based on a value of the identifier.

2. The node of claim 1, wherein the identifier indicates the packet is based on the reduced mode and the destination address is the SRv6 uSID.

3. The node of claim 1, wherein the identifier indicates the packet is based on the non-reduced mode and the destination address is the IPV6 destination address.

4. The node of claim 1, wherein the Flow Label field includes 20 bits with a plurality of least significant bits being used for the Flow Label and any of a remaining most significant bits being used for the identifier.

5. The node of claim 1, wherein the handling includes a terminate and shift operation responsive to the identifier indicating the packet is based on the reduced mode.

6. A non-transitory computer-readable medium comprising instructions that, when executed, cause a node, in a network that operates one or more of Internet Protocol version 6 (IPv6) and Segment Routing over IPv6 (SRv6), to perform steps of:
  receiving a packet from another node in the network, wherein the node supports both a reduced mode and a non-reduced mode;
  determining whether there is an identifier in the packet that indicates whether the packet is based on the reduced mode or the non-reduced mode, wherein the identifier is utilized to determine whether a destination address in the packet is either an IPV6 destination address or an SRv6 micro-Segment Identifier (uSID), wherein the identifier is a bit in a Flow Label field in an IPV6 header of the packet; and
  performing handling of the packet based on a value of the identifier.

7. The non-transitory computer-readable medium of claim 6, wherein the identifier indicates the packet is based on the reduced mode and the destination address is the SRv6 uSID.

8. The non-transitory computer-readable medium of claim 6, wherein the identifier indicates the packet is based on the non-reduced mode and the destination address is the IPV6 destination address.

9. The non-transitory computer-readable medium of claim 6, wherein the Flow Label field includes 20 bits with a plurality of least significant bits being used for the Flow Label and any of a remaining most significant bits being used for the identifier.

10. The non-transitory computer-readable medium of claim 6, wherein the handling includes a terminate and shift operation responsive to the identifier indicating the packet is based on the reduced mode.

11. A method implemented by a node configured to operate in a network that operates one or more of Internet Protocol version 6 (IPv6) and Segment Routing over IPv6 (SRv6), the method comprising steps of:
  receiving a packet from another node in the network, wherein the node supports both a reduced mode and a non-reduced mode;
  determining whether there is an identifier in the packet that indicates whether the packet is based on the reduced mode or the non-reduced mode, wherein the identifier is utilized to determine whether a destination address in the packet is either an IPV6 destination address or an SRv6 micro-Segment Identifier (uSID), wherein the identifier is a bit in a Flow Label field in an IPV6 header of the packet; and
  performing handling of the packet based on a value of the identifier.

12. The method of claim 11, wherein the identifier indicates the packet is based on the reduced mode and the destination address is the SRv6 uSID.

13. The method of claim 11, wherein the identifier indicates the packet is based on the non-reduced mode and the destination address is the IPv6 destination address.

14. The method of claim 11, wherein the Flow Label field includes 20 bits with a plurality of least significant bits being used for the Flow Label and any of a remaining most significant bits being used for the identifier.

15. The method of claim 11, wherein the handling includes a terminate and shift operation responsive to the identifier indicating the packet is based on the reduced mode.

* * * * *